United States Patent [19]

de Putter et al.

[11] 4,013,783

[45] Mar. 22, 1977

[54] PANCHROMATICALLY SENSITIVE ZINC OXIDE

[75] Inventors: Jan A. de Putter, Lomm; Johannes Kortenoeven, Helden-Panningen, both of Netherlands

[73] Assignee: Oce-van der Grinten N.V., Venlo, Netherlands

[22] Filed: Apr. 30, 1975

[21] Appl. No.: 573,140

[30] Foreign Application Priority Data

May 3, 1974 Netherlands ..................... 7405944

[52] U.S. Cl. .................................... 423/622; 96/1.8

[51] Int. Cl.[2] ...................... C01G 9/02; G03G 5/08

[58] Field of Search ........................ 338/15; 96/1.8; 423/622

[56] References Cited

UNITED STATES PATENTS

| | | | |
|---|---|---|---|
| 2,727,808 | 12/1955 | Thomsen | 423/622 |
| 3,329,590 | 7/1967 | Renfrew | 96/1.2 |

FOREIGN PATENTS OR APPLICATIONS

| | | | |
|---|---|---|---|
| 546,080 | 9/1957 | Canada | 423/622 |

OTHER PUBLICATIONS

"Zinc Oxide Rediscovered," 1963, pp. 60–71.

In Re Edwards 109 U.S.P.Q. 380; 1956 C.D. 264.

*Primary Examiner*—Oscar R. Vertiz
*Assistant Examiner*—Wayne A. Langel
*Attorney, Agent, or Firm*—Albert C. Johnston

[57] ABSTRACT

A stable panchromatically sensitized zinc oxide having a low moisture sensitivity with dark discharge properties rendering it suitable as the photoconductive material of elements for indirect as well as direct electrophotography is produced by reacting finely divided zinc oxide with gaseous ammonia and carbon dioxide, while keeping the zinc oxide particles in motion, until a critical stage is reached corresponding usually to a weight increase of 4 to 7.5%, at which point the reacting is terminated and the product is heated to constant weight at a temperature between 190° and 350° C. Photoconductive elements made with the panchromatically sensitive zinc oxide not only are reusable indefinitely under varying atmospheric humidity conditions without loss of their sensitivity, but also exhibit a memory effect much lower than that of known photoconductive zinc oxides.

8 Claims, No Drawings

PANCHROMATICALLY SENSITIVE ZINC OXIDE

Figure 1:
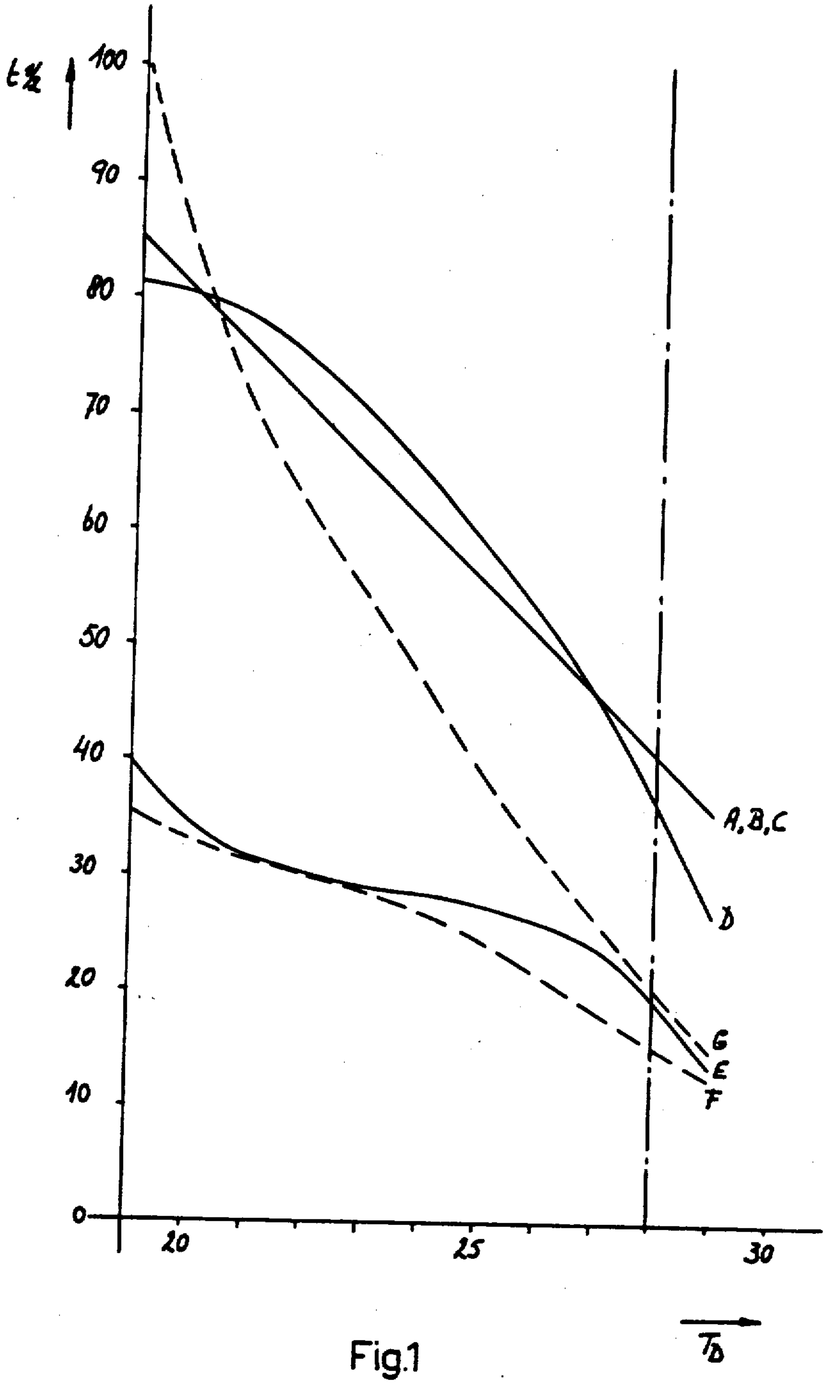

This invention relates to a process for the preparation of a panchromatically sensitive zinc oxide and to a photoconductive element containing a panchromatically sensitive zinc oxide.

Zinc oxide as used for electrophotography usually is sensitized panchromatically with organic dyestuffs. These dyestuffs have the disadvantage that they do not withstand frequent charging and exposing, as a result of which the light sensitivity of the sensitized zinc oxide decreases during its use in indirect electrophotographic processes.

Panchromatically sensitive zinc oxides not having this disadvantage have been described in U.S. Pat. No. 2,727,808. According to the disclosure of that patent, zinc oxide can be sensitized panchromatically by passing ammonia gas and carbon dioxide gas at a rate of 100 ml per minute into a tube filled with finely divided pure zinc oxide. For a filling of 50 g of zinc oxide, gas is let into one end of the tube for 30 minutes and, subsequently, into the other end for one hour; after which the reaction product is heated at 150° C for one hour and at 250° C for another hour. The same patent also mentions that zinc oxide can be sensitized panchromatically by reacting two parts by weight of ammonium carbamate acid carbonate with one part by weight of zinc oxide and heating the reaction product.

The reaction mechanism of the above process is not known. It is considered probable that in reacting zinc oxide with ammonia and carbon dioxide a complex compound is formed, which is decomposed during the subsequent heating. In this decomposition reaction nitrogen atoms are incorporated into the crystal lattice of the zinc oxide, possibly at locations where metallic zinc is present in the crystal lattice.

Panchromatically sensitive zinc oxide obtained according to the process of U.S. Pat. No. 2,727,808 has a high panchromatic light sensitivity, and is sensitivity does not decrease as a result of frequent charging and exposing. This zinc oxide, however, is not suitable for practical use in electrophotography, because photoconductive layers made with its exhibit a high dark discharge property. Their dark discharge increases with increases in the humidity of the ambient air, so that humidity concentrations which occur frequently will cause the dark discharge to become so high that fair copies can no longer be obtained.

The object of the present invention is to provide a panchromatically sensitized zinc oxide that does not exhibit a high dark discharge property, and that retains its light sensitivity through numerous charging and exposing steps. The process of this invention obviates the disadvantage of high dark discharge without prejudice to the desirable properties referred to above, thus providing a zinc oxide that is useful as the photoconductive medium for electrophotographic elements with which copies of good quality can be produced under all atmospheric conditions occurring in practice.

According to this invention, it has been found that the desired panchromatically sensitive zinc oxide can be obtained by contacting and reacting finely divided zinc oxide with ammonia gas and carbon dioxide gas and heating the reaction product at a temperature between 190° and 350° C until it attains a constant weight, if during the reacting with the gaseous ammonia and carbon dioxide the zinc oxide particles are mutually kept in motion and the reacting is terminated at a stage thereof at which the zinc oxide product will have a sensitivity to moisture still so low that it exhibits a half-potential dark discharge time of at least 25 seconds.

By the "half-potential dark discharge time" of the zinc oxide, as this expression is used herein, is meant the time required for a photoconductive layer made with the zinc oxide to reach half its maximum charging potential by discharge from that potential in the dark, where the layer is composed of the panchromatic zinc oxide and a moisture-insensitive binder in the weight ratio of 7:1, applied to a thickness of approximately 15 microns on a conductive support, and upon being charged to the maximum potential it is kept in the dark, in air having a temperature of 40° C and a dew point of 28° C, until its potential has dropped to half the maximum potential. It of course is to be understood that the possession of a half-potential dark discharge time of at least 25 seconds, as measured in a 40° C atmosphere having a dew point of 28° C, does not imply or mean that half of the maximum potential value may never be reached by dark discharge in less than 25 seconds; but this does mean that the dark discharge is low enough for practical use of the zinc oxide in electrophotography even under atmospheric conditions of higher humidity, which seldom occur.

The zinc oxide obtained according to the invention has a stable panchromatic sensitivity in addition to a low sensitivity to moisture, and it also exhibits a much lower memory effect than zinc oxide that either is not sensitized or is sensitized with dyestuffs.

In applying the present process to the various zinc oxides commercially available for electrophotographic use, optimal results can be obtained by ending the reaction at a moment when the weight of the solid substance, calculated for the zinc oxide, has increased by between 4 and 7.5 percent. Within this range the reaction time has little influence on the sensitivity to moisture and the panchromatic sensitivity. On the other hand, when the weight increase resulting from the reaction time is less than 4 percent, the panchromatic light sensitivity will decrease; and when the weight increase is above 7.5%, the sensitivity to moisture will increase rapidly.

It is considered probable that the panchromatic sensitivity increases until sufficient ammonia and carbon dioxide have been absorbed for covering the zinc oxide particles uniformly; whereupon a further supply of the gases no longer alters the panchromatic sensitivity. It is not known why the sensitivity to moisture increases when the reaction is continued to a weight increase above 7.5%. A possible explanation may be that the absorption of larger quantities of ammonia and carbon dioxide causes the formation of ammonium carbamate which, due to undercooling, may be present in the liquid phase and thus may dissolve some of zinc oxide, causing the dissolved zinc oxide, upon heating after reacting with the said gases, to precipitate again in the form of an acidic porous product possessing the sensitivity to moisture.

When the process according to the invention is applied to zinc oxides that depart from the usual specifications in respects such as the content of interstitial zinc and the specific surface values, the limits for the effective weight increase resulting from the reaction with ammonia and carbon dioxide may differ slightly from the percentages mentioned. In such cases, the variation from the stated range of the weight increase can be established experimentally.

The ammonia gas and carbon dioxide gas react with the zinc oxide in equimolar quantities. Therefore it is convenient to supply the gases in the molar ratio of 1:1. However, the molar ratio is not critical as long as each component is present sufficiently to carry out the reaction. For instance, if 100 ml of gas a minute is introduced per 50 g of zinc oxide, molar ratios of between 0.8:1 and 1.2:1 will give final products showing no appreciable differences in properties.

During the reaction with ammonia and carbon dioxide the temperature and pressure can be adapted to the desired reaction time. An increase of temperature and pressure will shorten the reaction time required. These reaction conditions, however, are to be chosen so that the temperature of the reacting substances remains under 145° C. This is important because an increase of temperature above 145° C will rapidly increase the sensitivity of the zinc oxide to moisture and rapidly decrease its panchromatic sensitivity. The complications that arise at temperatures above 145° C ar probably due to the formation of urea and liquid ammonium carbamate. Preferably, the reaction temperature is kept even below 100° C, in order to assure that the material will not be exposed to a temperature of 145° C or more that might occur here or there in the reaction chamber.

The process according to the invention may be carried out in a reaction vessel having a volume, relative to the volume of the reacting zinc oxide, that is large enough for the zinc oxide particles to be kept in motion. The particles can be kept in motion by, for example, a stirrer, a spiral conveyer or treatment in a fluidized bed. Other suitable methods include rotating the reactor about a horizontal axis, or flowing the zinc oxide from the top downwards through a reaction zone in counterflow with the gases.

The reaction is exothermic, and it proceeds spontaneously. Therefore, it is not necessary to increase the temperature. When a rotary reactor is used and equal volumes of ammonia and carbon dioxide at room temperature and atmospheric pressure are supplied at a velocity of 100 ml a minute to 50 g of zinc oxide, approximately 35% of the supplied quantity of gas will react with the zinc oxide, and the temperature in the reactor will rise from room temperature to about 50° C. Under these conditions, a reaction time of approximately 45 to 80 minutes suffices for attaining the desired weight increase of the zinc oxide. The gas that has not reacted can be recirculated.

When a reaction using the same amount of zinc oxide and the same gas feed rate is carried out in a reactor according to FIG. 1 of U.S. Pat. No. 2,727,808, the reaction temperature increases up to 75° C and the weight increase of the zinc oxide at the same feed time of the gas will be higher. By shortening the reaction time a product with a lower weight increase can be obtained in that reactor, but then the panchromatic sensitization of the product is unsatisfactory. An inhomogeneous reaction product probably is formed, one part of which has absorbed too much gas and is sensitive to moisture, while another part has absorbed too little and consequently has been insufficiently sensitized panchromatically.

The heating after the reaction with ammonia and carbon dioxide is effected at temperatures between 190° and 350° C. The panchromatic sensitivity of the zinc oxide decreases rapidly at higher temperatures, and at temperatures below 190° C a product having unfavorable electrophotographic properties is obtained. Products such as ammonium carbonate, urea, biuret, and the like, are likely left in the zinc oxide at temperatures below 190° C. Preferably the temperature is kept between 250° and 275° C. At these temperatures a heating time of approximately 1 hour suffices, and a longer heating time has no influence on the final result; nor has a lower starting temperature, preceding the heating in the range stated.

The panchromatically sensitive zinc oxide produced according to the invention can be used in photoconductive elements in the same way as the well known photoconductive zinc oxides. The support of the photoconductive element may consist of a metal or synthetic plastic material, or a paper, having a specific resistivity of approximately $10^{10}$ ohm. cm or lower. This limited resistivity may be possessed by the support material or may be imparted to it by conductive additives to the extent necessary. If required, the support may be provided with a conductive metal layer or with a layer containing a synthetic and a conductive substance such as, for instance, a layer of cellulose acetate-butyrate impregnated with carbon.

The photoconductive layer can be formed from a dispersion of the panchromatic zinc oxide in a polymeric binder suitable for electrophotographic use. Suitable binders are, e.g., polystyrene, polyacrylic and polymethacrylic esters, chlorinated rubber, vinyl polymers such as polyvinyl acetate and polyvinyl chloride, cellulosic esters and ethers, alkyd resins, epoxy resins and silicone resins, as well as copolymers and mixtures of these substances, such as a mixture of polyvinyl acetate and a styrene ethyl acrylate copolymer. Photoconductive binders may also be used, such a polyvinyl carbazole which may, or may not, be in the form of a donor-acceptor complex. The weight ratio of zinc oxide to binder corresponds to usual practice for zinc oxide binder layers. Good results are generally obtained using weight ratios between 10:1 and 3:1.

The panchromatically sensitive zinc oxide of the present invention can be further sensitized with organic dyestuffs, such as those used for the well known photoconductive zinc oxides. Dyestuffs that sensitize in the wavelength range between approximately 4,000 and 5,500 A increase the light sensitivity of this new zinc oxide relatively little, but its light sensitivity can be considerably increased with dyestuffs sensitizing in the wavelength range between approximately 5,500 and 7,000 A. For sensitizing in the wavelength range between approximately 5,500 and 7,000 A, use can be made, among others, of the green, bluish green and blue dyestuffs suitable for the sensitization of the well known zinc oxides, such as bromophenol blue, dinitrodibromo-phenolsulphonphthalein, methylene blue (C.I. 52015), Astrazon Blue B.G. (C.I. 51005), and Fast acid violet 10 B (C.I. 42571). The dyestuff concentration applied in the photoconductive layer can be that which is usual for zinc oxide. Concentrations between 0.001 and 1 percent, calculated on the zinc oxide, may be used.

Photoconductive elements containing the panchromatically sensitive zinc oxide of the invention can be used in direct and indirect electrophotographic processes, including indirect processes wherein charge patterns are transferred and those wherein powder images are transferred.

For use in direct electrophotographic processes, an uncolored photoconductive layer on paper is desired. The panchromatically sensitive zinc oxide according to the invention, if no dyestuffs are added, will form layers having a light orange-like tint. This color can be compensated with a blue dyestuff, which may be a sensitizing dyestuff, to give an extremely light grey color that is no less white in appearance than the usual zinc oxide-binder layers sensitized with color-compensated mixtures of dyestuffs. Depending upon whether a surface with a so-called warm-grey or cold-grey tint is desired, further dyestuffs may be added in addition to the blue dyestuff. Dyestuff quantities between approximately 0.005 and 0.04% by weight, calculated on the zinc oxide, generally suffice.

For use in indirect electrophotographic processes, the photoconductive element containing the panchromatic zinc oxide of the invention can be made in any form that is also suitable for the well known photoconductive zinc oxides. Because of the low memory effect of the panchromatically sensitive zinc oxide, the photoconductive element can also be in other forms, such as in the form of a relatively short endless belt, as well as being useful in the form of a zigzag folded belt such as that disclosed in Dutch Patent application No. 71 05941.

The practice of the invention will be further understood from the following illustrative examples.

EXAMPLE 1

A round flask of 250 ml volume containing 50 g of zinc oxide (Neige A of Societe de Mines et Founderies de la Vieille Montagne S.A.) was arranged so that its axis of symmetry formed an angle of 30° with the horizontal plane. Both ammonia gas and carbon dioxide gas at a temperature of 20° C and under atmospheric pressure were fed into the flask at a velocity of 50 ml a minute, while the flask was rotated about its axis of symmetry. The reaction was continued for 45 minutes and then terminated. During the reaction the temperature increased to 50° C. The reaction product, the weight of which had increased by 4.5%, was heated in an oven at 150° C for 1 hour, and at 260° C for another hour.

The panchromatically sensitive zinc oxide so obtained is hereinafter referred to as zinc oxide A.

The process was repeated four times under the same conditions, with four new portions of the same zinc oxide, but in these cases the reaction with ammonia and carbon dioxide was continued until weight increases of 6, 7, 7.5 and 8%, respectively, were attained. The panchromatically sensitive zinc oxides so obtained are hereinafter referred to as zinc oxides B, C, D and E, respectively.

For purposes of comparison, example 1 of U.S. Pat. No. 2,727,808 was reproduced. The process was carried out with 50 g of zinc oxide in a stationary tubular reactor as represented in FIG. 1 of the said patent, and the ammonia gas and carbon dioxide gas were both fed with a velocity of 50 ml per minute for 30 minutes into one end of the tube and for 60 minutes into the other end. The reaction product was heated at 150° C for 1 hour, and at 250° C for another hour. The zinc oxide obtained is hereinafter referred to as zinc oxide F.

The same example of U.S. Pat. No. 2,727,808 was repeated with a second portion of 50 g of zinc oxide, excepting that the second gas feed time of 60 minutes was shortened to 30 minutes. The zinc oxide so obtained is hereinafter referred to as zinc oxide G.

The zinc oxide A through G were individually dispersed in a solution in toluene of polyvinyl acetate and an ethyl acrylate-styrene copolymer (E202 resin of De Soto Chemical Company). The weight ratio of zinc oxide to binder was 7:1. Photoconductive layers having a thickness of approximately 15 micrometers were made with the various dispersions by coating them onto paper support material having a specific resistivity of about $10^{17}$ ohm.cm.

All the photoconductive elements thus obtained were charged to the maximum potential (Vm) by means of a negative corona, and the time required at an ambient temperature of 40° C for this potential to drop to half in the dark (t 1/2) was measured at various dew points ($T_D$). The results are summarized in Table 1 below.

Table 1

| Dew point | | A | B | C | D | E | F | G |
|---|---|---|---|---|---|---|---|---|
| 19.0° C | Vm in volts | 1020 | 1060 | 1000 | 1060 | 940 | 870 | 720 |
| | t ½ in sec. | 85 | 85 | 85 | 80 | 40 | 35 | 100 |
| 20.5° C | Vm | 1020 | 1060 | 1000 | 1060 | 960 | 870 | 710 |
| | t ½ | 75 | 75 | 75 | 80 | 30 | 32 | 75 |
| 23.0° C | Vm | 1000 | 1040 | 1020 | 1040 | 1000 | 860 | 720 |
| | t ½ | 65 | 65 | 65 | 70 | 28 | 29 | 55 |
| 27.0° C | Vm | 1020 | 1040 | 1020 | 1060 | 960 | 860 | 740 |
| | t ½ | 45 | 45 | 45 | 45 | 24 | 18 | 26 |
| 28.0° C | Vm | 1010 | 1010 | 1020 | 1010 | 980 | 850 | 730 |
| | t ½ | 41 | 41 | 41 | 38 | 20 | 16 | 21 |
| 29.0° C | Vm | 1000 | 1020 | 1000 | 1020 | 960 | 850 | 710 |
| | t ½ | 35 | 35 | 35 | 27 | 14 | 13 | 15 |

As will be evident from Table 1, samples A through D exhibited half-potential dark discharge times, as hereinabove defined, of at least 25 seconds; whereas samples E, F and G did not.

In FIG. 1 of the accompanying drawings, the half-value time t ½ for the samples A through G is plotted against the dew point $T_D$. As is evident from this figure, the photoconductive element made with the known zinc oxide is considerably inferior in respect of sensitivity to moisture to those made with the zinc oxides produced according to the invention. The light sensitivity in incandescent lamp light of the photoconductive elements made with zinc oxides A through F amounted to approximately 40 lux. seconds, by which is meant the number of lux. seconds required to drop the maximum potential to 10 percent. The photoconductive element made with zinc oxide G had a lower sensitivity to moisture than that made with the known zinc oxide F, but its light sensitivity was far lower, amounting to 250 lux. seconds.

EXAMPLE 2

A base paper suitable for electrophotography, having a top layer consisting of a conductive polymer, was coated with a dispersion of the following composition:

42 g of zinc oxide A obtained according to Example 1,
12 g of polyvinyl acetate and a copolymer of ethyl acrylate and styrene dissolved in toluene (E202 resin of De Soto Chemical Company, with 50% by weight of solid substance), and
58 ml of toluene. The average thickness of the coating was 13 to 14 microns.

The photoconductive element obtained had a light orange-like tint, could be charge to −700 volts, and had a light sensitivity of 40 lux. seconds (10 percent time in incandescent lamp light), an extremely low sensitivity to pre-exposure, and only a low memory effect. Approximately 5 seconds after the photoconductive element has been charged, exposed and developed, it can be used again without exhibiting memory effect. The light sensitivity remained the same after having charged and developed the element for 500 times.

When a silicone resin (SR82 of General Electric Company) is used instead of the E202 binder referred to, a product having the same properties is obtained. Nearly the same results are also obtained when the Neige A zinc oxide of this example is replaced by one of the following zinc oxides: Neige C, Kolloidal Extra (of Hamburger Zinkweiss Fabrik), Electrox 2500 (of Durham Raw Materials Ltd.), or Fotox 80 (of New Jersey Zinc Company).

EXAMPLE 3

A base paper suitable for electrophotography, having a top layer consisting of a conductive polymer, was coated with a dispersion of the following composition:

42 g of zinc oxide A obtained according to Example 1,
12 g of polyvinyl acetate and a copolymer of ethyl acrylate and styrene dissolved in toluene (E202 resin),
58 ml of toluene, and
0.10 ml of a 4 percent solution of bromophenol blue in methanol. The average thickness of the coating was 13 to 14 microns.

The photoconductive element obtained could be charged to −720 volts, and had a light sensitivity of 24 lux. seconds (10 percent time in incandescent lamp light).

Figure 2:
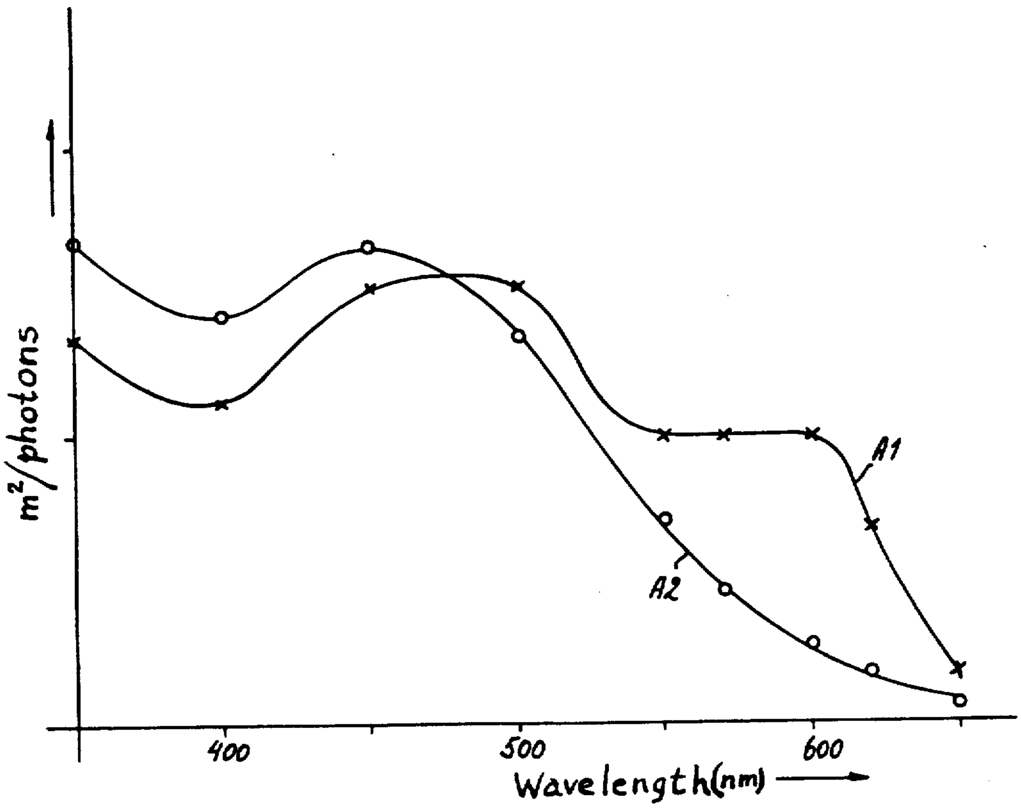

The photoconductive layer had an uncolored appearance, and was extremely well suited for the production of copies in a direct electrophotographic process using liquid development. Its spectral sensitivity is illustrated by curve A1 in FIG. 2 of the accompanying drawings, wherein curve A2 shows the spectral sensitivity of the photoconductive element obtained according to Example 2 above. FIG. 2 represents, for both photoconductive elements, the reciprocal value of the number of photons per square meter required in order to drop the maximum potential to half, as a function of the wavelength.

In this connection it is noted that the term panchromatically sensitive zinc oxide is used in this specification to mean a zinc oxide that is sensitive over practically the entire range of the visible spectrum. An example is the zinc oxide A produced according to Example 1 above and used in the photoconductive elements of Examples 2 and 3. The term panchromatically sensitive zinc oxide is therefore not limited to zinc oxides the sensitivity curve of which more or less coincides with the range of the average eye sensitivity.

What is claimed is:

1. In a process for producing a panchromatically sensitive zinc oxide, wherein finely divided zinc oxide is reacted with ammonia gas and carbon dioxide gas and the reaction product is heated to constant weight at a temperature between 190° and 350° C, the improvement which comprises keeping the zinc oxide particles mutually in motion during the reacting of them with the ammonia and carbon dioxide and terminating said reacting at a stage thereof at which the zinc oxide product will have a sensitivity to moisture so low that it exhibits a half-potential dark discharge time of at least 25 seconds, in that at least 25 seconds is required for a photoconductive layer made with the zinc oxide to reach half its maximum charging potential by discharge from that potential in the dark, where said layer is composed of the zinc oxide and a moisture-insensitive binder in the weight ratio of 7:1, applied to a thickness of approximately 15 microns on a conductive support, and upon being charged to the maximum potential the photoconductive layer is kept in the dark, in air having a temperature of 40° C. and a dew point of 28° C., until its potential has dropped to half the maximum potential.

2. A process according to claim 1, said reacting of the zinc oxide particles with ammonia and carbon dioxide being continued until and being ended when the weight of the solid reaction material has been increased by between 4 and 7.5 percent, calculated upon the original weight of the zinc oxide.

3. A process according to claim 1, and after said reacting effecting the heating of the reaction product at a temperature between 250° and 275 ° C.

4. In a process for producing a panchromatically sensitive zinc oxide, wherein finely divided zinc oxide is reacted with ammonia gas and carbon dioxide gas and the reaction product is heated to constant weight at a temperature between 190° and 350° C, the improvement which comprises keeping the zinc oxide particles mutually in motion and at a temperature below 100° C. during the reacting of them with the ammonia and carbon dioxide, continuing said reacting until and terminating it when it has increased the weight of the solid reaction material by between 4 and 7.5 percent, calculated upon the original weight of zinc oxide, and thereafter effecting the heating of the reaction product to constant weight at a temperature between 250° and 275° C.

5. A panchromatically sensitive zinc oxide containing nitrogen in its crystal lattice as produced by the process of claim 4.

6. A photoconductive element comprising a conductive support carrying a photoconductive layer containing panchromatically sensitive zinc oxide produced by the process of claim 4.

7. A panchromatically sensitive zinc oxide consisting essentially of a thermally stabilized, panchromatically sensitive reaction product of finely divided zinc oxide and ammonia and carbon dioxide gases, said product containing nitrogen in its crystal lattice and have been heated to constant weight at a temperature between 190° and 350° C. and having a sensitivity to moisture so low that it exhibits a half-potential dark discharge time of at least 25 seconds, in that at least 25 seconds is required for a photoconductive layer made with the zinc oxide to reach half its maximum charging potential by discharge from that potential in the dark, where said layer is composed of the zinc oxide and a moisture-insensitive binder in the weight ratio of 7:1, applied to a thickness of approximately 15 microns on a conductive support, and upon being charged to the maximum potential the photoconductive layer is kept in the dark, in air having a temperature of 40° C. and a dew point of 28° C., until its potential has dropped to half the maximum potential.

8. A photoconductive element comprising a conductive support carrying a photoconductive layer containing a panchromatically sensitive zinc oxide according to claim 7.

* * * * *

UNITED STATES PATENT OFFICE

CERTIFICATE OF CORRECTION

Patent No. 4,013,783 Dated March 22, 1977

Inventor(s) Jan A. de Putter et al.

It is certified that error appears in the above-identified patent and that said Letters Patent are hereby corrected as shown below:

On the title page, "No Drawings" should read --- 2 Drawing Figures ---.

In the drawings, Figures 1 and 2 should read as shown on the attached sheets.

Column 1, line 40, "is" should read --- its ---.

Column 1, line 44, "its" should read --- it ---.

Column 3, line 22, "ar" should read --- are ---.

Column 8, line 62, "have" should read --- having ---.

Signed and Sealed this

*Eighth* Day of *November 1977*

[SEAL]

*Attest:*

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 4,013,783 Dated March 22, 1977

Inventor(s) Jan A. de Putter et al.

It is certified that error appears in the above-identified patent and that said Letters Patent are hereby corrected as shown below:

Column 6, line 24, in place of "$10^{17}$" read -- $10^{7}$ --.

Signed and Sealed this

*Seventeenth* Day of *October 1978*

[SEAL]

*Attest:*

RUTH C. MASON
*Attesting Officer*

DONALD W. BANNER
*Commissioner of Patents and Trademarks*